US008537685B2

(12) United States Patent
Lee et al.

(10) Patent No.: US 8,537,685 B2
(45) Date of Patent: Sep. 17, 2013

(54) APPARATUS AND METHOD FOR PERFORMING CONGESTION CONTROL IN A COMMUNICATION SYSTEM

(75) Inventors: Chul-Ki Lee, Seoul (KR); Byung-Suk Kim, Seoul (KR); Seong-Ryong Kang, Seongnam-si (KR); Dong-Sook Kim, Suwon-si (KR); Hong-Kyu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 13/005,276

(22) Filed: Jan. 12, 2011

(65) Prior Publication Data
US 2011/0170414 A1 Jul. 14, 2011

(30) Foreign Application Priority Data
Jan. 12, 2010 (KR) .................. 10-2010-0002858

(51) Int. Cl.
*H04L 12/28* (2006.01)
(52) U.S. Cl.
USPC ............................ 370/236; 370/235; 370/338
(58) Field of Classification Search
USPC .......................................... 370/229–240, 338
See application file for complete search history.

(56) References Cited

U.S. PATENT DOCUMENTS

| 6,094,418 | A | * | 7/2000 | Soumiya et al. | 370/231 |
| 8,125,910 | B2 | * | 2/2012 | Shimonishi et al. | 370/236 |
| 8,139,480 | B2 | * | 3/2012 | Park et al. | 370/229 |
| RE43,322 | E | * | 4/2012 | Schultz et al. | 370/338 |
| 2004/0249917 | A1 | * | 12/2004 | Lin | 709/223 |
| 2006/0050640 | A1 | * | 3/2006 | Jin et al. | 370/235 |
| 2006/0126509 | A1 | * | 6/2006 | Abi-Nassif et al. | 370/235 |

* cited by examiner

*Primary Examiner* — Andrew Chriss
*Assistant Examiner* — Mohamed Kamara

(57) ABSTRACT

A method for performing congestion control in a communication system. The method includes transmitting a request message to a node using a first packet with a highest priority and receiving a response message corresponding to the request message using the first packet and at least one of a plurality of second packets, estimating a one-way delay of the first packet according to a round trip time for the first packet, converting one of the one-way delay of the first packet and the one-way delay of at least one of the plurality of second packets into a quality of service (QoS) level using a predetermined upper delay bound for a corresponding packet, and converting the converted QoS level into an effective congestion level representing a congestion degree in a network and performing congestion control using the effective congestion level.

18 Claims, 4 Drawing Sheets

APPARATUS AND METHOD FOR PERFORMING CONGESTION CONTROL IN A COMMUNICATION SYSTEM

CROSS-REFERENCE TO RELATED APPLICATION(S) AND CLAIM OF PRIORITY

The present application is related to and claims the priority under 35 U.S.C. §119(a) of an application entitled "Apparatus And Method For Performing Congestion Control In A Communication System" filed in the Korean Industrial Property Office on Jan. 12, 2010 and assigned Serial No. 10-2010-0002858, the contents of which are hereby incorporated by reference.

TECHNICAL FIELD OF THE INVENTION

The present invention relates to an apparatus and a method for performing congestion control in a communication system.

BACKGROUND OF THE INVENTION

In a next generation communication system, a QoS level for each kind of service class is measured and congestion detection is given priority in performance according to the measured level, thereby taking suitable measurements.

The next generation communication system employs an algorithm in which a delay between the service classes is measured and when the number of the measured values continuously exceeding a predetermined value is greater than a specific number, the system is detected that it is in a congestion state. However, in the above algorithm, there are problems in that reactions with priority for the congestion state are insufficient. Further, the congestion state is detected only when the number of the measured delays between the service classes continuously exceeding the predetermined value is greater than the specific number. Therefore, the congestion state may not be detected accurately depending on traffic patterns.

SUMMARY OF THE INVENTION

To address the above-discussed deficiencies of the prior art, it is a primary object to provide an apparatus and a method for performing congestion control in a communication system.

Further, another aspect of the present invention is to provide an apparatus and a method for measuring a QoS level for each kind of service class so as to perform congestion control in a communication system.

In accordance with an aspect of the present invention, there is provided an apparatus for performing congestion control in a communication system. The apparatus includes a transmitter configured to transmit a request message to a node using a first packet with a highest priority, a receiver configured to receive a response message corresponding to the request message using the first packet and at least one of a plurality of second packets, and a controller configured to estimate a one-way delay of the first packet according to a round trip time (RTT) for the first packet, estimate a one-way delay of at least one of the plurality of second packets based on the one-way delay of the first packet and a time difference between a reception time of the first packet and a reception time of at least one of the plurality of second packets, convert one of the one-way delay of the first packet and the one-way delay of at least one of the plurality of second packets into a quality of service (QoS) level using a predetermined upper delay bound for a corresponding packet, and convert the converted QoS level into an effective congestion level representing a congestion degree in a network and performing congestion control using the effective congestion level.

In accordance with another aspect of the present invention, there is provided a method for performing congestion control in a communication system. The method includes the steps of transmitting a request message to a node using a first packet with a highest priority, and receiving a response message corresponding to the request message using the first packet and at least one of a plurality of second packets, estimating a one-way delay of the first packet according to a round trip time MTV for the first packet, estimating a one-way delay of at least one of the plurality of second packets based on the one-way delay of the first packet and a time difference between a reception time of the first packet and a reception time of at least one of the plurality of second packets, converting one of the one-way delay of the first packet and the one-way delay of at least one of the plurality of second packets into a quality of service (QoS) level using a predetermined upper delay bound for a corresponding packet, and converting the converted QoS level into an effective congestion level representing a congestion degree in a network and performing congestion control using the effective congestion level.

According to the present invention, there is provided a method for measuring a QoS level for each kind of service class so as to perform congestion control. Therefore, according to the present invention, resource management can be advantageously performed by measuring the QoS levels at one time for service classes with any priority.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the below description, there will be described only parts required to understand the operation of the invention, and a detailed description of known technologies has been omitted for conciseness.

The present specification discusses the operations for performing congestion control in a communication system. Further, there will be described the operations for measuring a QoS level for each kind of service class so as to perform the congestion control in the communication system. In the following, embodiments where the communication system employs the 3rd Generation Partnership Project (3GPP) Long Term Evolution (LTE) system standard will be shown by way of example. However, it is matter of course that the communication system according to embodiments of the invention is not limited to a specific system standard.

Parameters used in measuring the QoS level include a bandwidth, a delay, a jitter, a packet loss and the like. The delay is divided into a serialization delay, a propagation delay, a queuing delay, a forwarding delay and the like.

Figure 1:
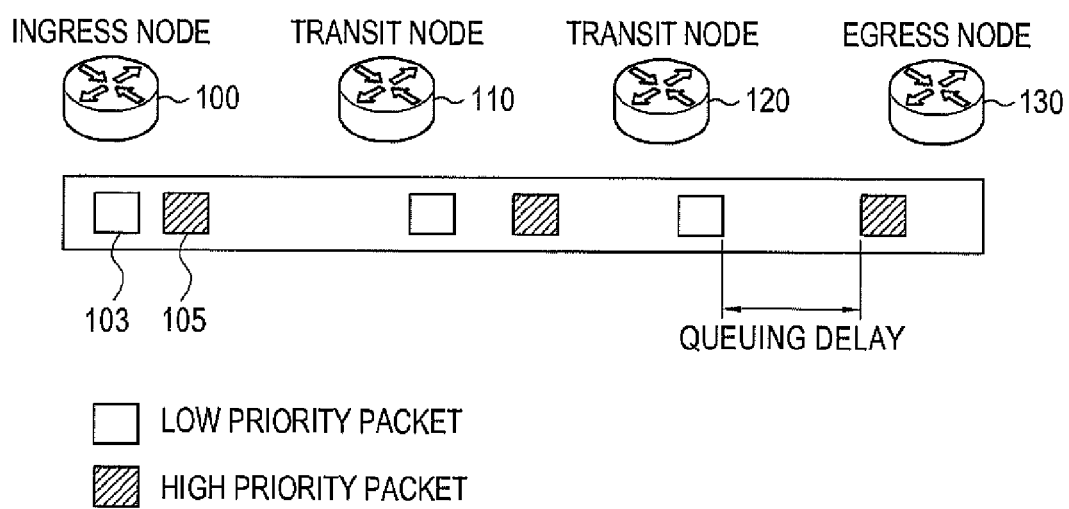
FIG. 1 illustrates a queuing delay between packets which have different priorities for each kind of service class in a communication system according to an embodiment of the invention.

FIG. 1 is a diagram illustrating a queuing delay between packets which have different priorities for each kind of service class in a communication system according to an embodiment of the invention. In FIG. 1, the queuing delays of two packets with different priorities will be described as an example. Hereinafter, for the convenience of explanation, the two packets will be referred to as a low priority packet 103 and a high priority packet 105, respectively.

Referring to FIG. 1, the low priority packet 103 and the high priority packet 105 begin to be transmitted from an ingress node 100. Then, the low priority packet 103 and the high priority packet 105 are transmitted to an egress node 130 through plural transit nodes 110 and 120.

When the high priority packet 105 reaches the egress node 130 earlier than the low priority packet 103, the queuing delay is generated between the high priority packet 105 and the low priority packet 103. Herein, the queuing delay is considered as a delay for the low priority packet 103.

In an LTE system, a delay of a corresponding packet is made to fall within a specific range (for example, from 95% to a specific value) in a specific section over a network, thereby satisfying a predetermined QoS level.

For example, in order to satisfy a QoS level for a packet with the highest priority of 1, a delay in a specific section (for example, a section between Node A and Node B is referred to as "section A-B") for the packet with priority 1 is made to be equal to or less than 50 ms. Further, in order to satisfy a QoS level for a packet with priority 2 lower than priority 1, a delay in the section A-B for the packet with priority 2 is made to be less than 100 ms.

Alternatively, assuming that there are packets with eight priorities different from each other, a QoS level for each packet may need to be measured in order to satisfy a predetermined QoS level of each packet. In order to measure the QoS level, a delay of each packet, that is, each service class in the section A-B is measured first.

The QoS level can be measured depending on how closely the measured delay approaches a predetermined upper delay bound. In other words, when a one-way delay of a packet with the upper delay bound of 50 ms is estimated at 50 ms, the QoS level of the packet can be calculated as 100%.

Figure 2:
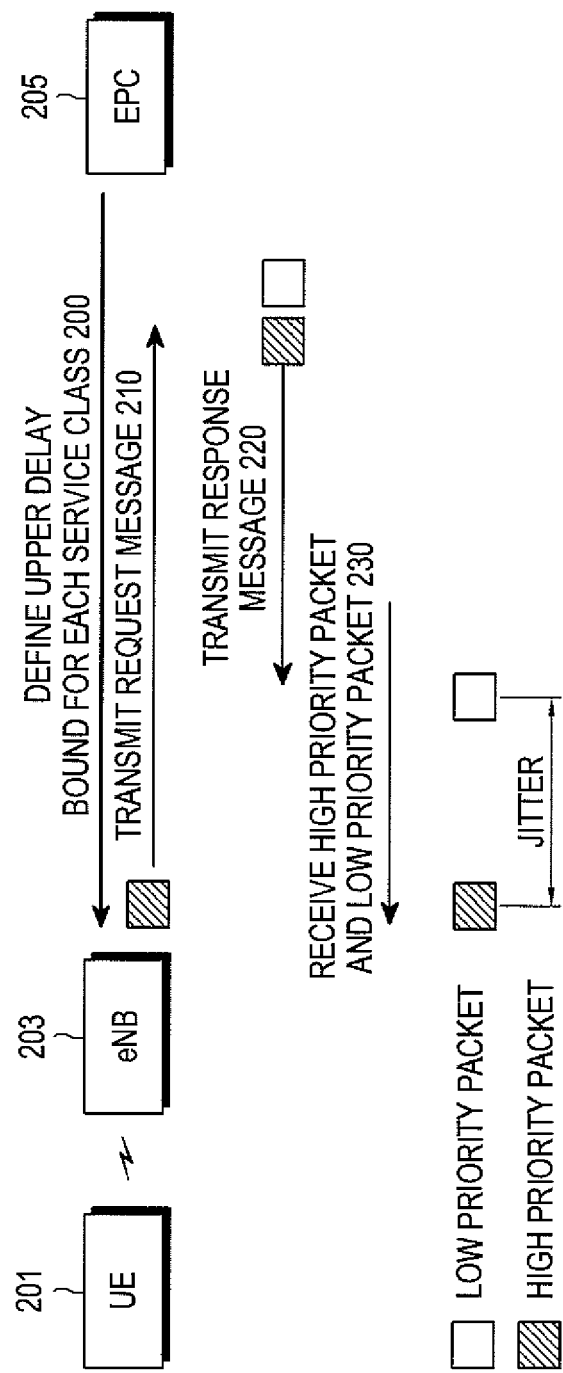
FIG. 2 illustrates an operation for measuring a QoS level of each service class in a communication system according to an embodiment of the invention.

FIG. 2 is a diagram illustrating an operation for measuring a QoS level of each service class in a communication system according to an embodiment of the invention.

Referring to FIG. 2, the communication system includes a user equipment (UE) 201, an enhanced Node B (eNB) 203 and an EPC (Evolved Packet Core) 205. Herein, the eNB 203 represents a receiver, and the EPC 205 represents a transmitter.

The EPC 205 defines the upper delay bound for each kind of service class (block 200) and informs the eNB 203. Further, the eNB 203 transmits a request message to the EPC 205 using a service class with a high priority, that is, the high priority packet (block 210). The EPC 205 transmits a response message to the request message to the eNB 203 using all service classes, that is, the high priority packet and the low priority packet (block 220).

The high priority packet and the low priority packet are subjected to delay which is different in each service class. Therefore, on transmitting the response message, a jitter is generated between the time when the high priority packet is received to the eNB 203 and the time when the low priority packet is received to the eNB 203 (block 230). In other words, the high priority packet is received to the eNB 203 earlier than the low priority packet, and then the low priority packet is received to the eNB 203 after the jitter is generated. At this time, the one-way delay (one-way_delay_high) of the high priority packet can be estimated using Equation 1 below:

$$\text{one-way\_delay\_high} = RTT/2. \quad \text{[Eqn. 1]}$$

In Equation 1, the RTT denotes a round trip time, which represents the time taken for receiving the response message to the request message after the transmission of the request message using the high priority packet.

Alternatively, a one-way delay (one-way_delay_low) of the low priority packet can be estimated as the sum of the one-way_delay_high shown in the following Equation 2 and the jitter.

$$\text{one-way\_delay\_low} = \text{one-way\_delay\_high} + \text{jitter} = RTT/2 + \text{jitter}. \quad \text{[Eqn. 2]}$$

The one-way delays one-way_delay_high and one-way_delay_low estimated using Equations 1 and 2 can be converted into QoS levels, respectively. Assuming that the upper delay bound between the eNB 203 and the EPC 205 for a specific quadratic configuration interaction (QCI), that is, a specific service class in the LTE system is 50 ms, when the one-way delay one-way_delay_low is estimated as 40 ms, the QoS level can be determined as 40 ms/50 ms=0.8 (that is, 80%).

As described above, since the RTT of the highest priority packet is very stable, the one-way delay can be estimated as RTT/2. However, as shown in FIG. 1, the queuing delays are generated in the packets with priorities lower than the highest priority. Therefore, the delay of the packet with a priority lower than the highest priority can be estimated using Equation 3 below:

a_delay_of_a_low_priority_packet=one-way_delay_of_the_highest_packet+received_time_difference_of_the_two_packet. [Eqn. 3]

That is, the term received_time_difference_of_the_two_packet, which is the time difference between the received time of the highest priority packet and the received time of the subsequent packets, is added to the one-way delay one-way_delay_of_the_highest_packet of the highest priority packet, so that the delay of the packet with a priority lower than the highest priority can be estimated.

Hereinafter, a method for estimating the one-way delay one-way_delay_of_the_highest_packet will be described.

Generally, a traffic amount of the packets with high priorities is not great. For example, when there are eight different priorities, the ⅛ traffic amount may be calculated to have the high priorities. Actually, a traffic amount of the packets with the high priorities is lower than ⅛. Therefore, the RTT measured for the packet with the highest priority approaches a minimum RTT. The minimum value min(one-way_delay_of_the_highest_packet) of the one-way delay one-way_delay_of_the_highest_packet of the highest priority packet can be estimated using Equation 4 below:

min(one-way_delay_of_the_highest_packet)=min(RTT_of_the_highest_packet)/2. [Eqn. 4]

However, since the minimum RTT value cannot always be measured, the minimum value of one-way_delay_of_the_highest_packet cannot always be estimated using Equation 4. Further, as described above, since the traffic amount of the packets with the high priorities is not great generally, the value of one-way_delay_of_the_highest_packet can be estimated using Equation 5 below:

one-way_delay_of_the_highest_packet=RTT_of_the_highest_packet/2. [Eqn. 5]

Hereinafter, a method for estimating the value of one-way_delay_of_the_highest_packet accurately will be described.

Assuming that a direction from Node A to Node B is referred to as a forward direction, that is, when the one-way delay from Node A to Node B and the one-way delay from Node B to Node A have the same value, the value of one-way_delay_of_the_highest_packet can be estimated accurately using Equation 5. However, when the one-way delay from Node A to Node B and the one-way delay from Node B to Node A are different from each other, there is an error in the value of one-way_delay_of_the_highest_packet estimated using Equation 5.

In order to reduce the error, the RTT of a corresponding packet is distributed to each section, that is, the section from Node A to Node B and the section from Node B to Node A, so as to be proportional to the QoS level from Node A to Node B and the QoS level from Node B to Node A which are measured last. As an example, a QoS level (QoS_level_A_to_B(i)) from Node A to Node B for the i-th packet can be estimated using Equation 6 below:

QoS_level_$A$_to_$B$(i)=QoS_level_$A$_to_$B$(i−1)/(QoS_level_$A$_to_$B$(i−1)+QoS_level_$B$_to_$A$(i−1)). [Eqn. 6]

That is, the QoS level from Node A to Node B for the (i−1)th packet is divided by the sum of the value of QoS_level_A_to_B(i−1) and the QoS level (QoS_level_B_to_A(i−1)) from Node B to Node A for the (i−1)th packet, so that the QoS level from Node A to Node B for the i-th packet can be estimated.

When the one-way delay from Node A to Node B and the one-way delay from Node B to Node A are different from each other, the one-way delay (one-way_delay_of_the_highest_packet (i)) of the i-th highest priority packet can be estimated using the estimated QoS_level_A_to_B(i). That is, the value of one-way_delay_of_the_highest_packet(i) can be estimated using Equation 7 below:

one-way_delay_of_the_highest_packet(i)=((RTT_of_the_highest_packet(i)−min(RTT_of_the_highest_packet))*QoS_level_$A$_to_$B$(i)+min(RTT_of_the_highest_packet))/2. [Eqn. 7]

As shown in Equation 7, the term min(RTT_of_the_highest_packet) is subtracted from the RTT of the i-th highest priority packet (RTT_of_the_highest_packet(i)) and the term QoS_level_A_to_B(i) is multiplexed, and then the term min (RTT_of_the_highest_packet) is added to the resultant value and then divided by 2, so that the one-way delay of the i-th highest priority packet can be estimated.

Hereinbefore, there has been described the one-way delay of the highest priority packet which is estimated in embodiments where the one-way delay from Node A to Node B and the one-way delay from Node B to Node A are different using Equations 6 and 7.

When the one-way delay from Node A to Node B and the one-way delay from Node B to Node A are different, the one-way delay (one-way_delay_of_a_packet_in_a_class(i)) of a corresponding packet among the other packets except for the highest priority packet can be estimated using Equation 8 below:

one-way_delay_of_a_packet_in_a_class(i)=one-way_delay_of_the_highest_packet(i)+received_time_difference_of_the_two_packet(i). [Eqn. 8]

That is, the term one-way_delay_of_the_highest_packet(i) is added to the time difference (received_time_difference_of_the_two_packet(i)) between the time when the highest priority packet is received and the corresponding packet is received, so that the one-way delay of the corresponding packet can be estimated.

The estimated value (one-way_delay_of_a_packet_in_a_class(i)) is converted into the QoS level (QoS_level(i)) using Equation 9 below:

QoS_level(i)=one-way_delay_of_a_packet_in_a_class(i)/upper_delay_bound_of_a_packet_in_a_class. [Eqn. 9]

That is, the value (one-way_delay_of_a_packet_in_a_class(i)) is divided by the upper delay bound (upper_delay_bound_of_a_packet_in_a_class) of the corresponding packet, so that the value (one-way_delay_of_a_packet_in_a_class) can be converted into the QoS level.

Further, the value (QoS_level(i)) can be converted into the value (QoS_level_now(i)) which represents a congestion level using Equation 10 below:

QoS_level_now(i)=Σa1(i)*QoS_level(i)+Σa2(i−1)*QoS_level_now(i−1) (i>i-constant_$K$) =a*QoS_level(i)+(i−a)*QoS_level_now(i−1). [Eqn. 10]

That is, the value (QoS_level_now(i)) represents a value which is obtained by taking an average of an accumulated value of the QoS levels for a specific time.

When a standard deviation of the accumulated value of the QoS levels becomes high, the estimated value (QoS_level_now(i)) decreases in accuracy. Therefore, the value (QoS_level_now(i)) can be converted into the value (effective_QoS_level(i)) representing an effective congestion level in consideration of the standard deviation as shown in Equation 11 below:

$$\text{effective\_QoS\_level}(i) = \text{QoS\_level\_now}(i) + b*\sigma. \quad [\text{Eqn. 11}]$$

In Equation 11, $\sigma$ denotes the standard deviation, and b denotes a predetermined value for adjustment. For example, when b=2, the value $2*\sigma$ is added to QoS_level_now(i) in order to adjust 95% traffic not to exceed the upper delay bound, so that the value (QoS_level_now(i)) can be converted into the value (effective_QoS_level(i)).

Figure 3:
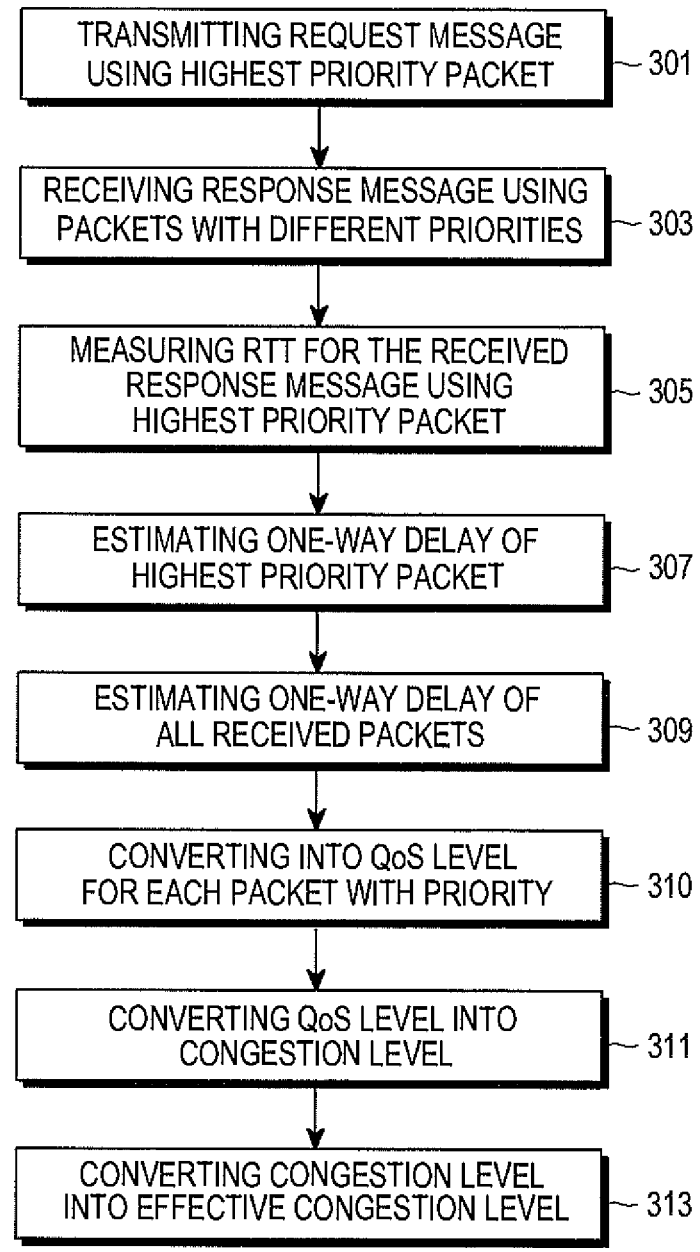
FIG. 3 illustrates a procedure in which a receiver measures a QoS level of each service class in a communication system according to an embodiment of the invention.

FIG. 3 is a flowchart illustrating a procedure in which a receiver measures a QoS level of each service class in a communication system according to an embodiment of the invention.

Referring to FIG. 3, the receiver transmits a request message to a transmitter using the packet with the highest priority (hereinafter, referred to as "the highest priority packet") in block 301. Further, in block 303, the receiver receives a response message from the transmitter using the packets with different priorities, and then proceeds to block 305. Herein, one of the packets with different priorities has the highest priority. Therefore, the response message can be received using the highest priority packet and the packets with priorities different from the highest priority.

In block 305, the receiver measures the RTT for the received response message using the highest priority packet. Further, the receiver estimates the one-way delay of the highest priority packet using Equation 5, in block 307.

Subsequently, in block 309, the receiver estimates the one-way delay for packets except for the highest priority packet among the received packets using Equation 3.

Then, in block 310, the receiver converts the estimated one-way delays in blocks 307 and 309 into the QoS levels for respective packets according to the priorities using Equation 9, and then proceeds to block 311. In block 311, the receiver converts the QoS level into the congestion level using Equation 10. Further, in block 313, the receiver converts the congestion level into the effective congestion level using Equation 11.

The effective congestion level is reported to a control node which finally performs congestion control. At the control node, the congestion control is performed using the effective congestion level for each priority, though not shown in FIG. 3. For example, assuming that the effective congestion level in a network accommodating 300 terminals is 75%, it can be expected that 100 terminals can be contained for the future in order to make the effective congestion level be equal to or less than 100%.

Figure 4:
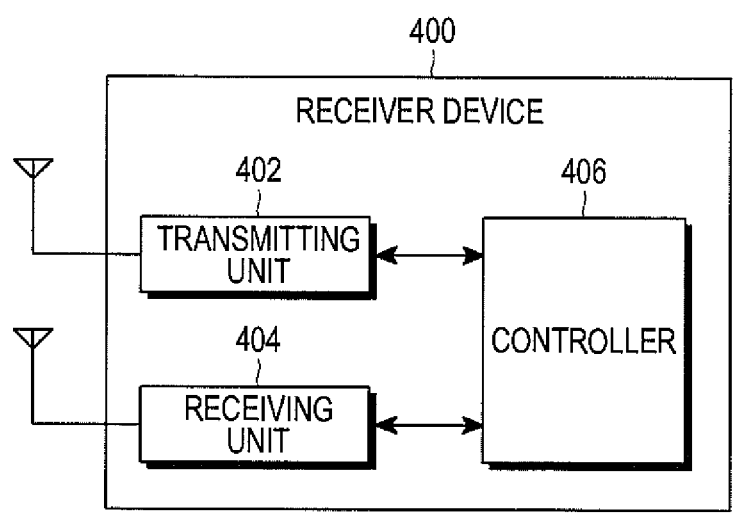
FIG. 4 illustrates a receiver which measures a QoS level of each service class in a communication system according to an embodiment of the invention.

FIG. 4 is a diagram illustrating a receiver which measures a QoS level of each service class in a communication system according to an embodiment of the invention.

Referring to FIG. 4, the receiver device 400 includes a transmitting unit 402, a receiving unit 404 and a controller 406.

The transmitting unit 402 transmits a request message using the highest priority packet. Further, the receiving unit 404 receives a response message to the request message using the highest priority packet and packets with priorities different from the highest priority.

The controller 406 measures the RTT of the received response message using the highest priority packet, and estimates the one-way delay of the highest priority packet. Further, the controller 406 adds different values between the time when the response message is received using the highest priority packet and the times when the response messages of the packets with priorities different from the highest priority to the one-way delay of the estimated highest priority packet, so that the one-way delay for each packet with a priority different from the highest priority.

Further, the controller 406 converts the estimated one-way delays for respective packets according to the priorities into the QoS levels using the predetermined upper delay bound. The controller 406 accumulates the converted QoS levels for a specific time, calculates an average value of the accumulated QoS levels and converts the average value into the congestion level. Further, the controller 406 converts the converted congestion level into the effective congestion level.

In this specification, a method for measuring the QoS level for each kind of service class has been described as an example, the method including transmitting the request message from the receiver to the transmitter; receiving the response message to the request message from the transmitter; and estimating the one-way delay of the highest priority packet and the one-way delay of the packets with priorities different from the highest priority. However, the method for measuring the QoS level for each kind of service class described in this specification can be applied to embodiments where the request message is transmitted from the transmitter to the receiver and the response message to the request message is received by the receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing congestion control in a communication system, the method comprising:
   transmitting a request message to a node using a first packet with a highest priority, and receiving a response message corresponding to the request message using the first packet and at least one second packet;
   estimating a one-way delay of the first packet;
   estimating a one-way delay of the at least one of the plurality of second packet;
   converting one of the one-way delay of the first packet and the one-way delay of the at least one second packet into a quality of service (QoS) level using a predetermined upper delay bound for a corresponding packet; and
   converting the converted QoS level into an effective congestion level to be used for performing congestion control,
   wherein the highest priority of the first packet and a priority of the at least one second packet are different.

2. The method of claim 1, wherein estimating the one-way delay of the first packet comprises calculating a round trip time (RTT)/2 for the first packet, if the one-way delay of the first packet in a forward direction and the one-way delay of the first packet in a reverse direction are the same.

3. The method of claim 1, wherein estimating the one-way delay of the first packet comprises distributing a round trip time (RTT) for the first packet to a forward section and a reverse section so as to be proportional to a last measured QoS level in a forward direction and the last measured QoS level in a reverse direction, if the one-way delay of the first packet in the forward direction and the one-way delay of the first packet in the reverse direction are different.

4. The method of claim 1, wherein converting into the QoS level comprises dividing one of the one-way delay of the first packet and the one-way delay of the at least one second packet by the upper delay bound.

5. The method of claim 1, wherein performing the congestion control comprises:
    accumulating the converted QoS level for a specific time and converting an average value of the accumulated QoS level into a congestion level; and
    converting the converted congestion level into the effective congestion level based on a standard deviation of the accumulated QoS level.

6. The method of claim 1, wherein the one-way delay of the at least one second packet is estimated using a jitter value.

7. The method of claim 1, wherein each one-way delay of the at least one second packet is estimated by adding the one-way delay of the first packet to the time difference between the reception time of the first packet and the reception time of the at least one second packet.

8. An apparatus for performing congestion control in a communication system, the apparatus comprising:
    a transmitter configured to transmit a request message to a node using a first packet with a highest priority;
    a receiver configured to receive a response message corresponding to the request message using the first packet and at least one second packet; and
    a controller configured to estimate a one-way delay of the first packet, estimate a one-way delay of the at least one second packet, convert one of the one-way delay of the first packet and the one-way delay of the at least one second packet into a quality of service (QoS) level using a predetermined upper delay bound for a corresponding packet, and convert the converted QoS level into an effective congestion level to be used for performing congestion control,
    wherein the highest priority of the first packet and a priority of the at least one second packet are different.

9. The apparatus of claim 8, wherein the controller estimates the one-way delay of the first packet by calculating a round trip time (RTT)/2 for the first packet, if the one-way delay of the first packet in a forward direction and the one-way delay of the first packet in a reverse direction are the same.

10. The apparatus of claim 8, wherein the controller estimates the one-way delay of the first packet by distributing a round trip time (RTT) for the first packet to a forward section and a reverse section so as to be proportional to a last measured QoS level in a forward direction and the last measured QoS level in a reverse direction, if the one-way delay of the first packet in the forward direction and the one-way delay of the first packet in the reverse direction are different.

11. The apparatus of claim 8, wherein the controller is further configured to divide one of the one-way delay of the first packet and the one-way delay of the at least one second packet by the upper delay bound so as to be converted into the QoS level.

12. The apparatus of claim 8, wherein the controller is further configured to accumulate the converted QoS level for a specific time, convert an average value of the accumulated QoS level into a congestion level, and convert the converted congestion level into the effective congestion level based on a standard deviation of the accumulated QoS level.

13. The apparatus of claim 8, wherein the one-way delay of the at least one second packet is estimated using a jitter value.

14. The apparatus of claim 8, wherein each one-way delay of the at least one second packet is estimated by adding the one-way delay of the first packet to the time difference between the reception time of the first packet and the reception time of the at least one second packet.

15. The apparatus of claim 8, wherein the controller estimates the one-way delay of the first packet according to a round trip time (RTT) for the first packet.

16. The apparatus of claim 8, wherein the controller estimates the one-way delay of the at least one second packet based on the one-way delay of the first packet and a time difference between a reception time of the first packet and a reception time of the at least one second packet.

17. The method of claim 1, wherein estimating the one-way delay of the first packet comprises estimating the one-way delay of the first packet according to a round trip time (RTT) for the first packet.

18. The method of claim 1, wherein estimating the one-way delay of the at least one second packet estimating the one-way delay of the at least one second packet based on the one-way delay of the first packet and a time difference between a reception time of the first packet and a reception time of the at least one second packet.

* * * * *